United States Patent
Tremmel et al.

(10) Patent No.: US 10,717,144 B2
(45) Date of Patent: Jul. 21, 2020

(54) GRID WELDING MACHINE AND METHOD FOR PRODUCING WIRE GRIDS

(71) Applicant: EVG ENTWICKLUNGS—U. VERWERTUNGS-GESELLSCHAFT M.B.H., Raaba (AT)

(72) Inventors: Robert Tremmel, Graz (AT); Georg Droschl, Kitzeck (AT); Klaus Ritter, Graz (AT)

(73) Assignee: EVG ENTWICKLUNGS-U. VERWERTUNGS-GESELLSCHAFT M.B.H., Raaba (AT)

( * ) Notice: Subject to any disclaimer, the term of this patent is extended or adjusted under 35 U.S.C. 154(b) by 0 days.

(21) Appl. No.: 16/342,395

(22) PCT Filed: Oct. 4, 2017

(86) PCT No.: PCT/AT2017/000070
§ 371 (c)(1),
(2) Date: Apr. 16, 2019

(87) PCT Pub. No.: WO2018/107188
PCT Pub. Date: Jun. 21, 2018

(65) Prior Publication Data
US 2019/0337083 A1 Nov. 7, 2019

(30) Foreign Application Priority Data
Dec. 14, 2016 (AT) ..................... 566/2016

(51) Int. Cl.
*B23K 11/00* (2006.01)
*B23K 101/32* (2006.01)

(52) U.S. Cl.
CPC ........ *B23K 11/008* (2013.01); *B23K 2101/32* (2018.08)

(58) Field of Classification Search
CPC .................................................... B23K 11/008
(Continued)

(56) References Cited

U.S. PATENT DOCUMENTS 2,725,081 A   11/1955   Griesemer
3,676,632 A   7/1972   Ritter et al.
(Continued)

FOREIGN PATENT DOCUMENTS

AT   213205   1/1961
AT   346668   11/1978
(Continued)

OTHER PUBLICATIONS

English translation of International Search Report from corresponding PCT Appln. No. PCT/AT2017/000070 dated Feb. 2, 2018.
(Continued)

*Primary Examiner* — Serkan Akar
*Assistant Examiner* — Spencer H. Kirkwood
(74) *Attorney, Agent, or Firm* — Grossman, Tucker, Perreault & Pfleger, PLLC

(57) ABSTRACT

A grid welding machine operating continuously based on the electrical resistance principle having a stationary longitudinal frame, whereon a horizontal group of parallel longitudinal wires can continuously be moved in the production direction by means of a feeding device, and having a pulling-off device, by means of which the cross wires can be pulled off a coil or rings and fed transversely to the group of longitudinal wires in a transfer device extending transversely, which transfer device can pick up multiple cross wires and convey them one after the other towards the longitudinal wires and bring them into contact with said longitudinal wires in the correct orientation according to the scaling of the cross wires and drop them there, and having electrodes and counter electrodes the weld surfaces of which (Continued)

can be pressed against each other with the points of intersection formed between the longitudinal wires and the cross wires therebetween.

10 Claims, 6 Drawing Sheets

(58) Field of Classification Search
USPC .............................................. 219/56; 140/112
See application file for complete search history.

(56) References Cited

U.S. PATENT DOCUMENTS

| | | | |
|---|---|---|---|
| 3,961,153 A | 6/1976 | Smith et al. | |
| 4,121,629 A | 10/1978 | Sackl et al. | |
| 4,190,758 A * | 2/1980 | Gott | B23K 11/008 |
| | | | 219/56 |
| 4,221,951 A * | 9/1980 | Connolly | B21F 27/10 |
| | | | 140/112 |
| 4,673,786 A * | 6/1987 | Gott | B23K 11/008 |
| | | | 219/56 |
| 2011/0150381 A1* | 6/2011 | Matsumoto | B23K 11/314 |
| | | | 384/517 |
| 2011/0170946 A1* | 7/2011 | Schneegans | B21D 39/021 |
| | | | 403/271 |

FOREIGN PATENT DOCUMENTS

| | | |
|---|---|---|
| AT | 357005 | 10/1979 |
| AT | 515914 | 1/2016 |
| DE | 2032922 | 7/1970 |
| EP | 0150704 | 8/1985 |
| EP | 1579932 | 9/2005 |
| FR | 1193844 | 11/1959 |

OTHER PUBLICATIONS

English translation of Office Action from corresponding Austrian Appln. No. A566/2016, dated Nov. 14, 2017.
English translation of Decision to Grant from corresponding Austrian Appln. No. A566/2016, dated Dec. 20, 2017.

* cited by examiner

GRID WELDING MACHINE AND METHOD FOR PRODUCING WIRE GRIDS

FIELD

The invention relates to a grid welding machine operating continuously based on the electrical resistance principle, having a stationary longitudinal frame, whereon a horizontal group of parallel longitudinal wires can slowly and continuously be moved in the production direction by means of a feeding device, and having a pulling-off device, by means of which the cross wires can be pulled off a coil and fed transversely to the group of longitudinal wires in a transfer device extending over or under said wires, which transfer device can pick up multiple cross wires and convey them one after the other towards the longitudinal wires and bring them into contact with said longitudinal wires in the correct orientation according to the scaling of the cross wires and drop them there, and having electrodes and counter electrodes, the weld surfaces of which can be pressed against each other with the points of intersection formed between the longitudinal wires and the cross wires therebetween, wherein both the upper electrodes and the lower counter electrodes are arranged on an inner frame mounted to said stationary frame and movable back and forth periodically in the longitudinal direction relative to said frame, and the upper electrodes are mounted to said movable frame for movement from an upper position downwards onto the points of intersection placed on the lower counter electrodes, wherein said electrodes reach a first lower position of the beginning welding process in contact with the points of intersection and then, while maintaining the contact pressure, travel along by moving the frame in the longitudinal direction together with the lower counter electrodes and synchronously with the grid into a second position of the ending welding process, which is at the same height level and in the rear with respect to the direction of flow, the electrodes and counter electrodes then reaching their former position with respect to the longitudinal direction again by moving the inner frame back, while the upper electrodes can first be moved vertically upwards and then again downwards into their former first position of the beginning welding process at the following cross wire(s), wherein the cross wires can be brought into contact with the group of longitudinal wires in the correct orientation by means of gripping fingers.

BACKGROUND

In most practical applications, grid welding machines are used in which the horizontal group of longitudinal wires is moved intermittently to allow welding the longitudinal wires at non-moving points of intersection of the grid to laterally fed cross wires in intervals between movements. It is a disadvantage in this respect that the entire grid and the entire device needed for its movement must be braked down and accelerated again for each of the welding phases, which produces much noise and leads to a very high energy consumption.

To avoid these disadvantages, the applicant has proposed a continuously operating welding system in its patent specification AT-B-357 005. The group of longitudinal wires is moved continuously at a constant speed in the longitudinal direction and cross wires are conveyed towards the longitudinal wires one after the other above the moving group and brought into contact with said longitudinal wires in the correct orientation and in accordance with the scaling of the cross wires, and welded to them at the points of intersection of the grid by means of electrodes and counter electrodes using the electrical resistance principle; the lower electrodes are pressed against the upper counter electrodes with the points of intersection arranged therebetween. The electrodes and counter electrodes are configured as rolls which are pivotably mounted to axles arranged transversely to the longitudinal direction and roll off each other with the points of intersection of the longitudinal wires and cross wires which are passing through; the electrodes make only sporadic contact with each other at the respective points of intersection. The duration of the welding processes is limited to a short period of sporadic contact of the rotating rolls, such that this period of time is only sufficient for complete welding at the points of intersection when the grid passes through very slowly. For the same reason, grids made of thicker wires can therefore not be produced at all using this process.

This applies likewise to the method known from the applicant's patent specification AT-B-346 668 for producing a lattice strip of intersecting groups of wires which extend in a zigzag shape relative to the longitudinal direction of the strip. Here, the groups of wires continuously pass through a welding area comprising electrodes which are moved along. Again, only low production speeds and/or wire diameters can be used due to the short period of time available for welding.

SUMMARY

It is therefore the problem of the invention to eliminate the severe disadvantages of known continuously operating grid welding machines mentioned above. The invention relates to a method for producing elongate wire grids from a horizontal group of parallel longitudinal wires, which are welded to cross wires extending at a right angle thereto at the points of intersection of the longitudinal and cross wires, as described in the document AT-B-357 005 cited above. The group of longitudinal wires is moved continuously at a constant speed in the longitudinal direction and cross wires are conveyed towards the longitudinal wires one after the other above and optionally also below the moving group and brought into contact with said longitudinal wires in the correct orientation and in accordance with the scaling of the cross wires, and welded to them at the points of intersection of the grid by means of electrodes and counter electrodes using the electrical resistance principle; the lower electrodes are pressed against the upper counter electrodes with the points of intersection arranged therebetween. The invention implements in such a method the further steps that the upper electrodes are moved from an upper position downwards onto the points of intersection to be formed lying on the lower counter electrodes, until, after placing the one or the two respective cross wire(s) onto the longitudinal wires they reach a first position of the beginning welding process and then travel along with the grid in the longitudinal direction synchronously with the lower counter electrodes while maintaining a constant or sometimes varying contact pressure, wherein the welding is performed during the forward movement in the required time, whereafter the electrodes and counter electrodes jointly travel back to their former position with respect to the longitudinal direction, while the upper electrodes are moved back into their upper position and then down again into the position of the beginning welding process in contact with the points of intersection of the one or two following cross wire(s).

The grid welding machine according to the invention, which operates based on the electrical resistance principle, is developed from the known welding machine as described in the document AT-B-357 005 cited above: The known machine comprises a stationary machine frame, whereon a horizontal group of parallel longitudinal wires can continuously be moved in the production direction by means of a feeding device, and a pulling-off device, by means of which the cross wires can be pulled off a coil and fed transversely to the group of longitudinal wires in a transfer device extending over or under said wires, which transfer device can pick up multiple cross wires and convey them one after the other towards the longitudinal wires and bring them into contact with said longitudinal wires in the correct orientation according to the scaling of the cross wires and drop them there; in addition, the machine comprises electrodes and counter electrodes, the weld surfaces of which can be pressed against each other with the points of intersection formed between the longitudinal wires and the cross wires therebetween. Furthermore, both the upper electrodes and the lower counter electrodes are arranged on an inner frame mounted to said outer longitudinal frame and movable back and forth periodically in the longitudinal direction relative to said frame, and the upper electrodes are mounted for movement from an upper position downwards onto the points of intersection placed on the lower counter electrodes, wherein said electrodes reach a first lower position of the beginning welding process in contact with the points of intersection and then, while maintaining the contact pressure, travel along by moving the frame in the longitudinal direction together with the lower counter electrodes and synchronously with the grid into a second position of the ending welding process, which is at the same height level, the electrodes and counter electrodes then reaching their former position with respect to the longitudinal direction again by moving the frame back, while the upper electrodes can first be moved vertically upwards and then again downwards into their former first position of the beginning welding process at the following cross wires, wherein the cross wires can be brought into contact with the group of longitudinal wires in the correct orientation by means of gripping fingers.

Based on this prior art, according to the invention, the gripping fingers provided for each of the weld points can be moved to the transfer device which picks up the multiple cross wires coming from the pull-off device for picking up the cross wires and can then be moved together with a picked-up cross wire to the points of intersection until the cross wire contacts the points of intersection at a time directly before the upper electrodes arrive and the gripping fingers, by means of the movable frame, first travel along a first section before welding begins and then together with the electrodes and counter electrodes travels along another section of the horizontal path they travel synchronously with the longitudinal wires of the grid to be formed, whereupon the synchronous travel of the electrodes and counter electrodes can be continued until welding is completed.

Advantages of the invention, compared to intermittently operating welding machines which have been used predominantly, are extremely advantageous and include much lower energy consumption, possible high production speeds, and much lower noise since the multiple braking and accelerating of the produced lattice strip and the devices needed for moving it are eliminated.

BRIEF DESCRIPTION OF THE DRAWINGS

The invention is explained in more detail with reference to an exemplary embodiment of a grid welding machine according to the invention shown in the figure, wherein.

DETAILED DESCRIPTION

Figure 1:
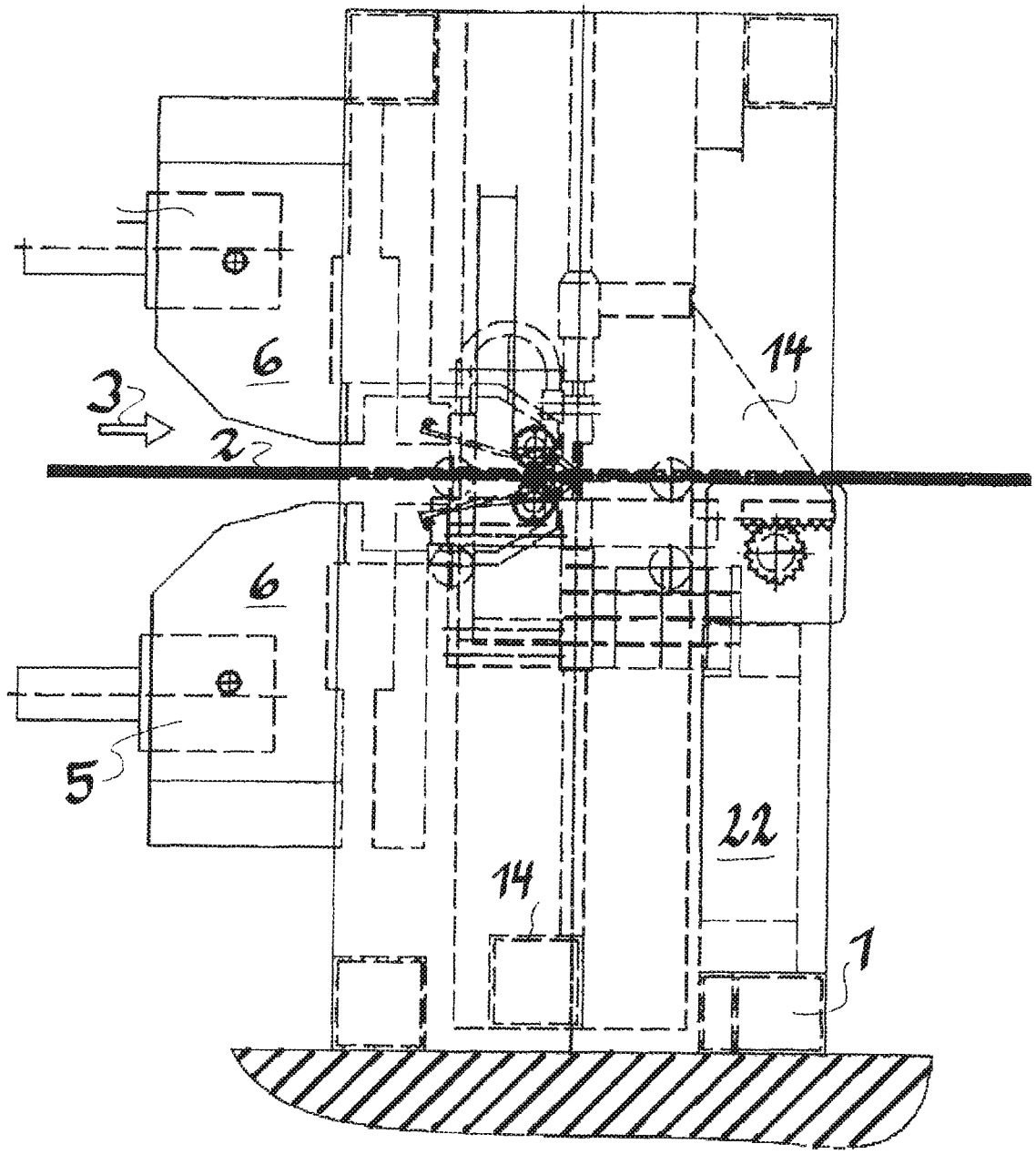
FIG. 1 shows a schematic overall side view of the machine.
Figure 2:
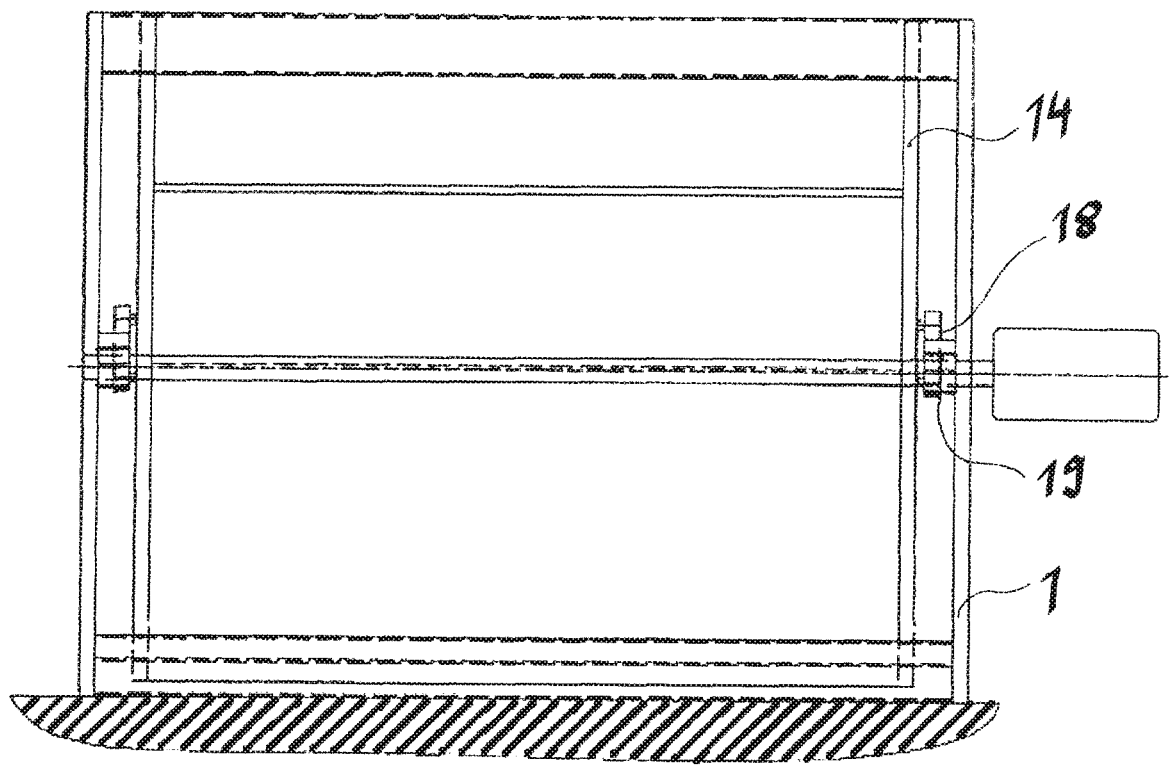
FIG. 2 shows a front view of this machine.
Figure 3:
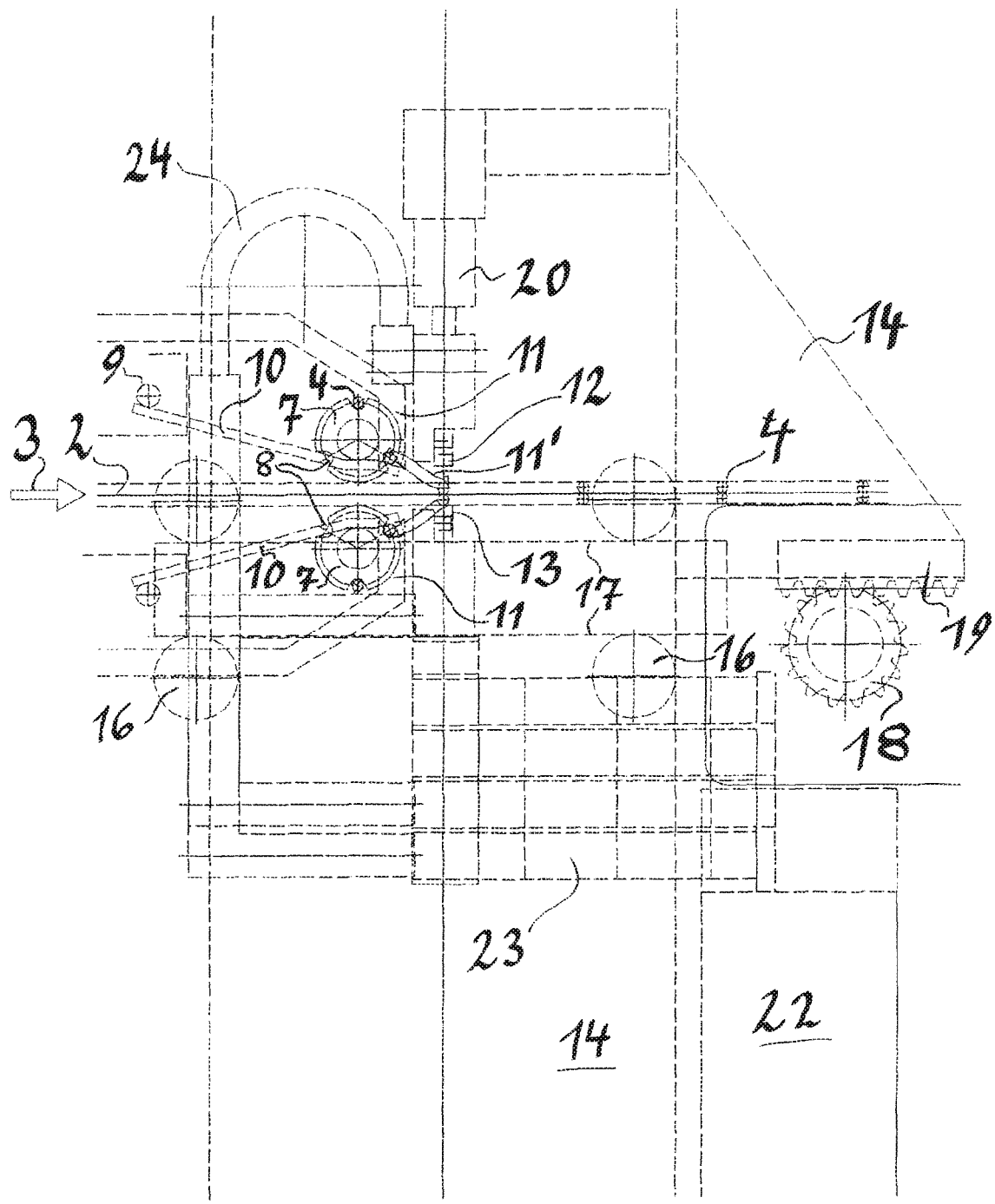
FIG. 3 shows a side view of the central part of the machine according to FIGS. 1 and 2.

As FIGS. 1-3 show, the grid welding machine has a stationary outer frame 1 with a horizontal working plane 2 (shown bold in FIG. 1) in which a group of horizontal parallel longitudinal wires (not shown) is moved in the production direction 3 by means of a feeding device (not shown), e.g. in the form of rolls or rollers. Unlike the grid welding machines predominantly used in current practice, in which the horizontal group of longitudinal wires is moved intermittently to allow welding of the longitudinal wires at stationary points of intersection of the grid to cross wires fed in from the side in intervals between movements, the group of longitudinal wires is moved continuously at a constant speed in the direction of production.

The cross wires 4 can either be fed from the top or the bottom or from both sides to the group of longitudinal wires, so as to form grids with the layer of cross wires above or below the longitudinal wires. For feeding the cross wires 4, the coiled wire is pulled off a coil 5 using a pulling-off device 6, cut to the required length of the cross wires 4, which are then fed to the transfer device, which can pick up multiple cross wires 4. The transfer devices are configured as drums 7 arranged transversely to the group of longitudinal wires above or below said group, of which one drum 7 is mounted above the group of longitudinal wires and one drum 7 is mounted below the group of longitudinal wires to the stationary outer frame 1 together with a respective rotary drive. A joint rotary drive for the upper drum 7 and the lower drum 7, which if required can be disconnected from one of the drums 7 and then drives the other drum 7 only is conceivable as well. The drums 7 comprise on their surfaces longitudinally extending grooves 8, which are open towards the outside. Each drum 6 has at least three evenly distributed grooves 8, at least two of which accommodate one cross wire 4 each. The drums 7 can be rotated intermittently; in intervals between movements, an insertion device not described in detail herein inserts a cross wire 4 from the side across its entire machine width into a groove 8 located on the upper side or lower side of the drum 7, whereupon the cross wire 4 is stopped in its final position above or below the group of longitudinal wires at the end of the groove 8; such a drum 7 including its required braking device for the cross wires 4 enclosed in the grooves 8 is described in the applicant's published patent specification EP-A-1 579 932, such that we need not explain it in detail herein; to prevent the cross wires 4 from falling out when the drum 7 continues rotating, the cross wire 4 is held by means of a flap 10 which is hinged at 9 to the stationary outer frame 1; at the same time at which the cross wire 4 mentioned above is inserted into the groove 8, the cross wire 4 located after the rotating step in a groove 8 of the drum 7 into which a cross wire 4 was previously fed is picked off from there.

Picking off is performed by opening the flap 10 by means of a row of synchronously moved gripping fingers 11, which position the cross wire 4 thereafter into its final welding position while maintaining its horizontal transverse orientation by moving it towards the working plane 2 and in the production direction 3. The configuration of the gripping fingers 11 is explained below. The row of gripping fingers 11 moves the picked-off cross wire 4 as follows: First, the cross wire 4 is moved along a section of an approximately elliptical curved path 11' in the production direction 3 forward and upward or downward into contact with the moved group of longitudinal wires. Then the gripping fingers 11 travel for a short straight path along with the longitudinal wires and the cross wire 4 to be welded to them. As an example, the length of this short path is about 5 mm at a production speed of about 0.35 to 0.5 m/s. Then the gripping fingers 11 return along a section of an elliptical curved path back and upwards or downwards into their initial gripping position to pick off the next cross wire 4 lying in the next groove 8.

Directly after placing the cross wire 4 onto the longitudinal wires, weld surfaces of electrodes 12 coming from above move to the points of intersection of the wire grid, which rest on the weld surfaces of the counter electrodes 13. The interacting weld surfaces are pressed against each other with the points of intersection of the grid therebetween until the welding process is completed after the time required for welding has expired. To obtain a sufficiently welded connection that meets the requirements at a production speed of, for example, 0.35 to 0.5 m/s, the electrodes 12 and counter electrodes 13 must travel along for a maximum distance of about 80 mm.

The electrodes 12 and counter electrodes 13 are arranged on an internal frame 14 (or carriage), which is mounted to the stationary outer frame 1 and can be moved horizontally to and fro relative to said outer frame, wherein the travel path corresponds to the 80 mm mentioned as an example. The internal movable frame 14 is configured in form of a carriage which can travel by means of castors 16 along a guide 17 of the outer frame 1. The frame 14 is driven by means of a motor-driven drive pinion 18, which is mounted on the outer frame 1 and engages in a toothed rack 19 which is fastened to the frame 14.

For upward and downward movement, the electrodes 12 are guided vertically on the internal frame 14 and can be moved by means of an adjusting drive, e.g. in the form of hydraulic or pneumatic cylinder-piston assemblies 20.

The gripping fingers 11 are configured according to the principle published in detail in the applicant's document AT-B-515 914, such that a detailed description is not necessary herein. A number of gripping fingers 11 that matches the number of longitudinal wires, which fingers comprise a V-shaped notch for picking off the cross wire 4, are fastened on the other end to a horizontal working beam arranged in the transverse direction above or below the longitudinal wires. The working beam can be moved by means of a lever system which is hinged on a fixed point and comprises two eccentric tappets, one of which performing a horizontal movement, the other eccentric tappet performing a vertical movement. Another lever system facilitates the elastic pressing of the cross wire 4 against the longitudinal wires by the gripping fingers 11 along the short path on which the gripping fingers 11 move along with the points of intersection of the grid until the weld surfaces of the electrodes 12 hit the points of intersection and press them against the counter electrodes 13 and hold the points of intersection together. Elastic pressing allows adjustment to various thicknesses of the cross wires 4.

The contact pressure of the electrodes 121 can be kept constant for the entire welding cycle or follow a predetermined profile depending on the material to be welded. Such a profile may include the three steps of "pre-pressing without power", "welding", and "follow-up pressing", each having a different contact pressure The lever systems result in a self-contained path of the gripping fingers 11 along a curved path as described above.

The drawing shows stationary welding transformers 22 fastened to the outer frame 1, which are connected via flexible conductor lines 23 and a power bridge 24 fastened to the frame 14 to the counter electrodes 13 and the electrodes 12, respectively.

Figure 4:
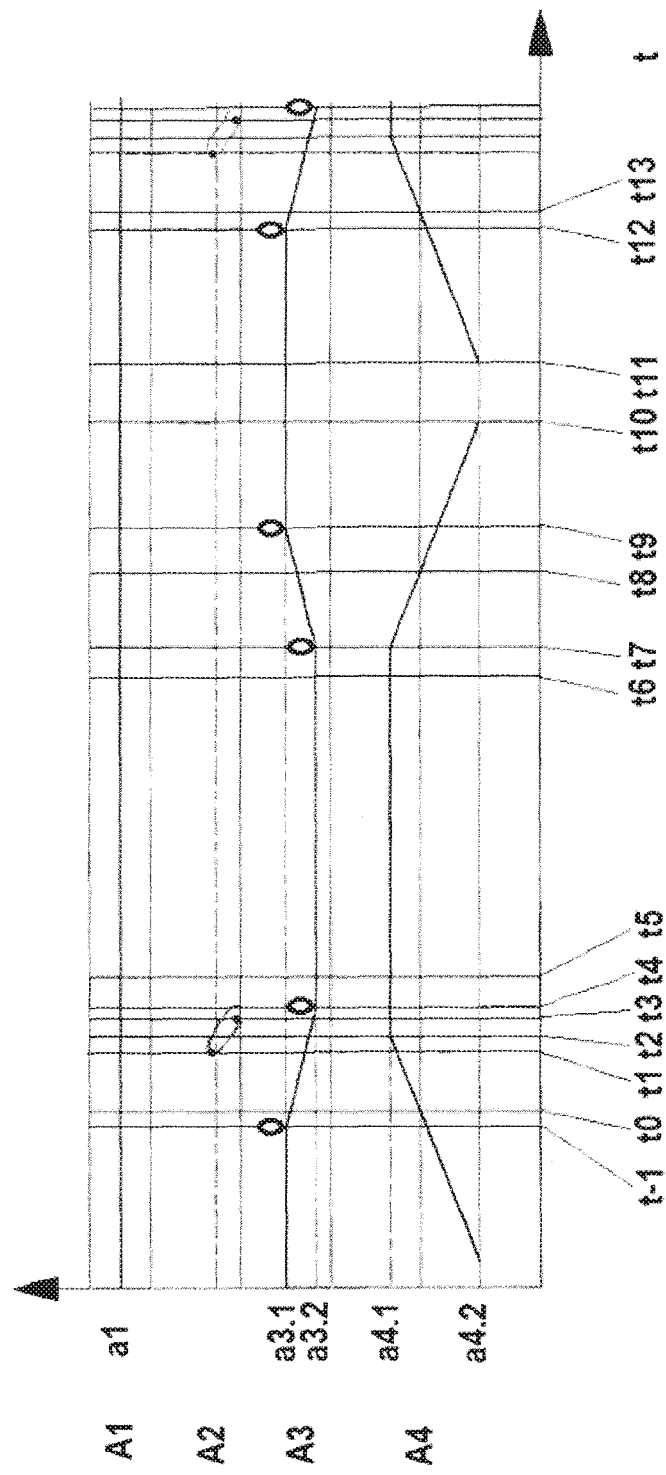
FIGS. 4-6 are working diagrams of the machine at different production speeds, which show the times of use of various components and illustrate the method.
Figure 5:
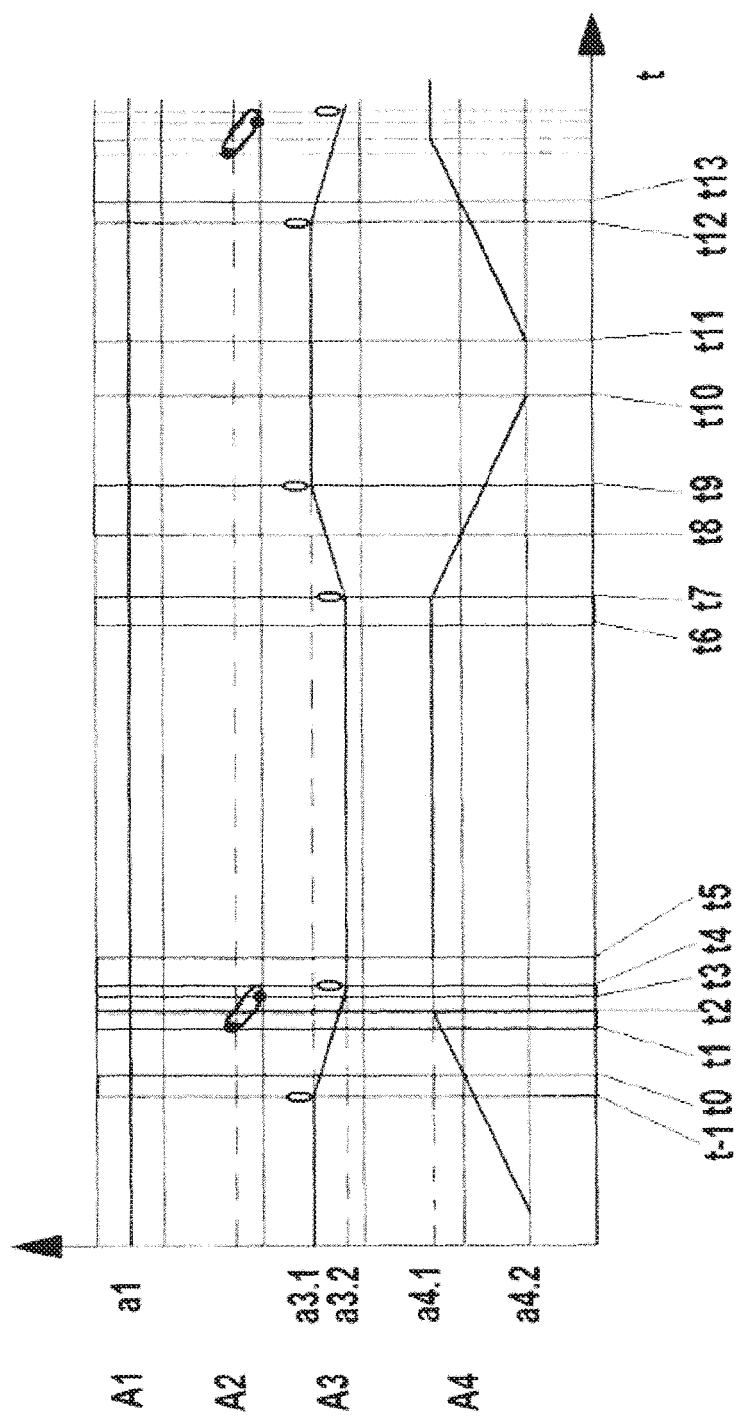
Figure 6:
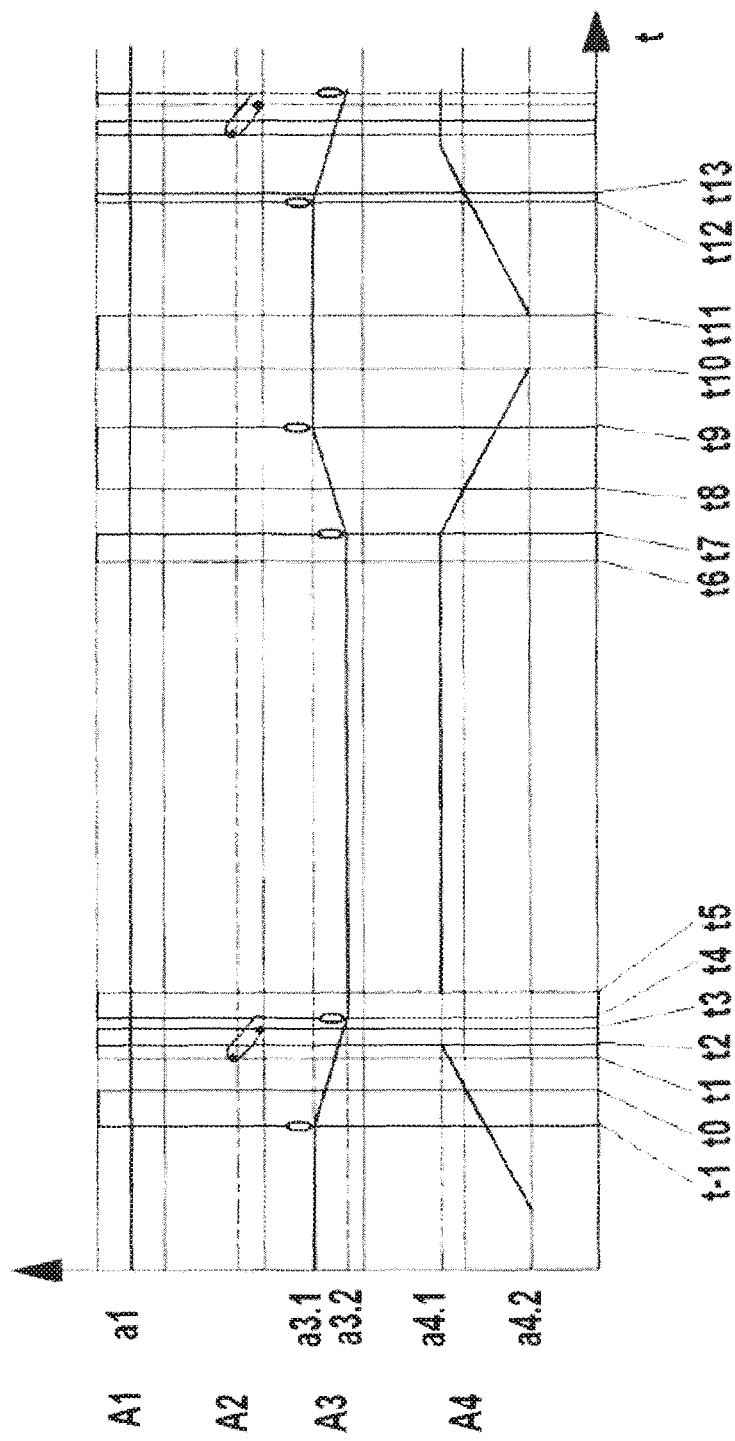

FIGS. 4-6 combine respective diagram segments for the various moving components A1 to A4 of the welding machine according to the invention via a common x-axis representing the time for a welding cycle. These show the interaction of the movements of the various components A1-A4: A1 refers to the feeding device for the wire grid or its longitudinal wires, A2 to the gripping fingers 11, A3 to the vertical movement of the upper welding electrodes 12, and A4 to the horizontal movement of said electrodes and the lower counter electrodes 13 by moving the frame 14 to and fro.

The working diagrams shown in FIGS. 4-6 refer to the production of a grid having a cross wire scaling of 150 mm. The following production speeds are distinguished (FIG. 4: 0.5 m/s; FIG. 5: 0.45 m/s; FIG. 6: 0.342 m/s), the number of welding cycles performed per minute (FIG. 4: 200; FIG. 5: 190; FIG. 6: 180) and the number of alternative current cycles needed per welding cycle (FIG. 4: 5; FIG. 5: 6; FIG. 6: 8).

In diagram segment A1, the speed of the feeding device for the grid is plotted on the y-axis, and its constant variable a1 is visible.

In diagram segment A2, the vertical path of the gripping fingers 11 when conveying the cross wire 4 from the drum 7 to the group of longitudinal wires is plotted on the y-axis. The movement of the gripping fingers 11 starts at time t1, whereupon the cross wire 4 reaches the group of longitudinal wires at time t3 after passing through a first section of an approximately elliptical curved path. Then the gripping fingers 11 briefly travel along with the grid until time t4, lift away from it at t4 and then continue moving along the approximately elliptical curved path until they return to the position they were in earlier at t1.

In diagram segment A3, the vertical path of the upper welding electrodes 12 by means of the cylinder-piston assemblies 20 is plotted on the y-axis. Starting from the open position a3.1 taken at time t−1, an acceleration follows until time t2 where the grid speed is reached; at time t4, the welding electrodes reach the closed position a3.2 at the bottom and hold the cross wire 4 on the longitudinal wires; pre-pressing of the points of intersection also starts at time t4, shortly before the welding process starts at t5. The welding process lasts from time t5 to subsequent time t6. A short follow-up pressing phase of the welding electrodes 12 follows until time t7; the welding electrodes 12 have traveled along in sync with the grid from time t4 to time t7; at time t7, the welding electrodes 12 lift off the points of intersection upwards and reach their initial position of time t−1 again at time t9. At time t12, the welding electrodes 12 start moving downwards again.

In diagram segment A4, the speed of the horizontal travel to and fro of the upper welding electrodes 12 and the lower counter electrodes 13 of the carrying frame 14 are plotted on the y-axis. Its maximum speed in the production direction 3 is identified as a4.1, the maximum speed in the opposite direction is identified as a4.2. It is visible that the speed of the frame 14 is decelerated from time t7 until reaching the reversal point at time t8, then it is accelerated in the opposite direction until time t10 at which the maximum return speed is reached. Deceleration of the return travel of the frame 14 starts at time t11, which from time t13 travels in the production direction 3 again.

The welding cycle shown in FIGS. 4-6 takes from t0 to t13.

What is claimed is:

1. A grid welding machine, comprising:
   the grid welding machine operable continuously based on an electrical resistance principle,
   a stationary longitudinal frame, whereon a horizontal group of parallel longitudinal wires are movable continuously in a production direction by a feeding device, and
   a pulling-off device, by which cross wires are pullable off a coil or rings and fed transversely to the group of longitudinal wires in a transfer device extending transversely, which transfer device is configured to pick up the cross wires and convey the cross wires one after another towards the longitudinal wires and bring the cross wires into contact with the longitudinal wires in a correct orientation according to a scaling of the cross wires and drop the cross wires upon contact with the longitudinal wires, and
   upper electrodes and lower counter electrodes each having a weld surface, respectively, the weld surfaces of which are pressable against each other with points of intersection formed between the longitudinal wires and the cross wires therebetween to form a grid,
   wherein both the upper electrodes and the lower counter electrodes are arranged on an inner frame mounted to the stationary frame and movable back and forth periodically in a longitudinal direction relative to the stationary frame, and the upper electrodes are mounted to the inner frame for movement from an upper position downwards onto the points of intersection formed between the longitudinal wires and the cross wires,
   wherein the upper electrodes are movable downwards from the upper position to reach a first position of a beginning welding process in contact with the points of intersection formed between the longitudinal wires and the cross wires and then, while maintaining contact pressure, travel along by moving the inner frame in the longitudinal direction together with the lower counter electrodes traveling from a first position and synchronously with the grid into a second position of an ending welding process, which is at a same height level and in a rear with respect to a direction of flow, the upper electrodes and the lower counter electrodes then returnable to the first positions, respectively, with respect to the longitudinal direction again by moving the inner frame back, while the upper electrodes are movable vertically upwards and then again downwards into the first position of the beginning welding process of following cross wires,
   wherein the cross wires are bringable into contact with the group of longitudinal wires in the correct orientation by gripping fingers,
   wherein the gripping fingers are movable to the transfer device and then movable together with one of the cross wires picked-up by the transfer device towards the longitudinal wires until the cross wire contacts the longitudinal wires to form the points of intersection at a time before the upper electrodes arrive at the first position, and
   wherein the gripping fingers, by the movable inner frame, first travel alone along a first section of a travel path of the inner frame before welding begins and then together with the upper electrodes and the lower counter electrodes travel along another section of a horizontal path synchronously with the longitudinal wires, whereupon the synchronous travel of the upper electrodes and the lower counter electrodes is continuable until welding is completed.

2. The grid welding machine according to claim 1, wherein the transfer device is configured as a drum extending transversely to the group of longitudinal wires above or under the longitudinal wires, which drum comprises longitudinally extending grooves in each of which a cross wire is accommodatable after a respective rotation of the drum and picked off from the drum one after another by the gripping fingers.

3. The grid welding machine according to claim 1, wherein the coil, the pull-off device, the gripping fingers, and a welding transformer needed for welding based on the electrical resistance principle are mounted on the stationary frame.

4. The grid welding machine according to claim 1, wherein power supply units provided for supplying power from stationary transformers to the upper electrodes and the lower counter electrodes are configured as flexible conductor lines or power cables across a partial area extending to the movable inner frame.

5. The grid welding machine according to claim 1, wherein the travel path of the inner frame, which is movable to and fro in the longitudinal direction, is equal to the horizontal path of the upper electrodes and the lower counter electrodes during welding and is in a range of 30 mm to 80 mm long.

6. The grid welding machine according to claim 1, wherein the section of the horizontal path travelled jointly by the electrodes and counter electrodes during welding, which section is also travelled by the gripping fingers in sync with the points of intersection, is in a range of 3 mm to 10 mm long.

7. The grid welding machine according to claim 5, wherein, at a production speed of the grid in a range of 0.35 m/s to 0.5 m/s, the first section of the travel path of the gripping fingers alone is 5 mm and the further joint travel section of the horizontal path of the gripping fingers with the upper electrodes and the lower counter electrodes is 80 mm long.

8. The grid welding machine according to claim 2, wherein at least one of the cross wires located in one of the grooves of the drum is prevented from falling out of the groove before being picked off by the gripping fingers by a pivotable flap.

9. The grid welding machine according to claim 1, wherein the movable frame moves horizontally by a motor-driven drive pinion, which engages in a toothed rack fastened to the movable frame.

10. The grid welding machine according to claim 1, wherein one or more hydraulic or pneumatic cylinder-piston assemblies are arranged on the movable inner frame for moving the upper electrodes upwards and downwards along the inner frame.

* * * * *